Dec. 8, 1964    W. BRANDL    3,159,889
SLIDING FASTENER
Filed March 9, 1964    2 Sheets-Sheet 1
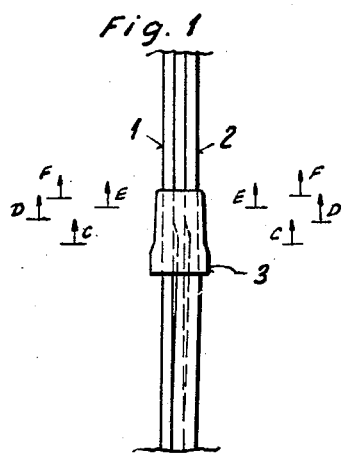
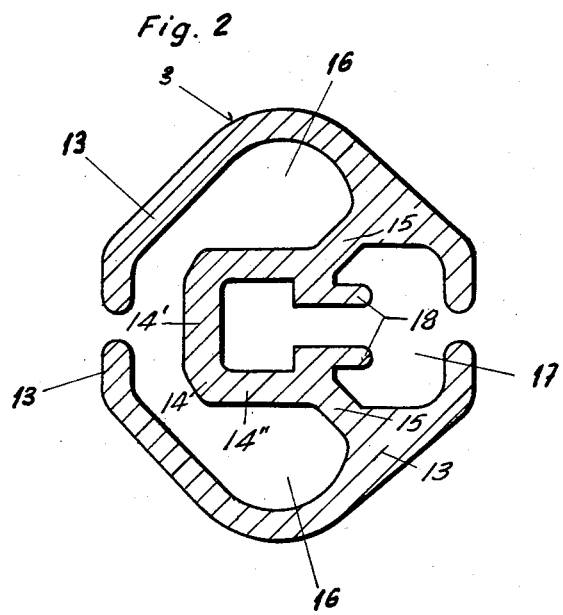
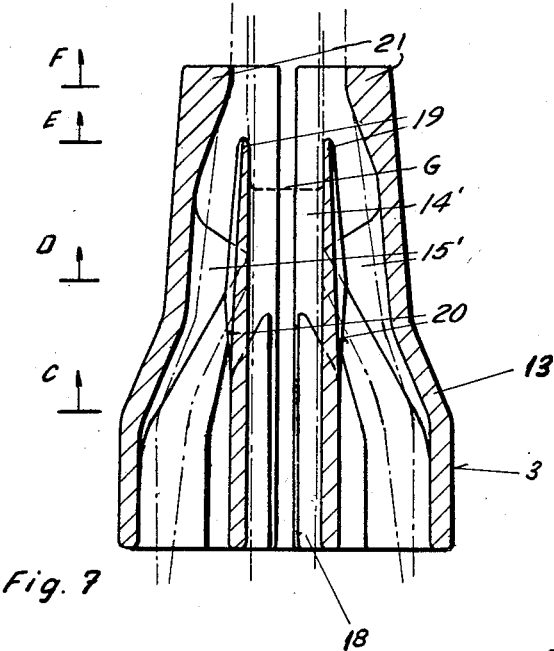
INVENTOR:
Willi Brandl
By Werner W. Kleeman
His Attorney

… …

United States Patent Office 3,159,889
Patented Dec. 8, 1964

3,159,889
SLIDING FASTENER
Willi Brandl, Zurich, Switzerland, assignor to Amplector Aktiengesellschaft, Zurich, Switzerland, a corporation of Switzerland
Filed Mar. 9, 1964, Ser. No. 350,178
Claims priority, application Switzerland, Mar. 11, 1963, 3,035/63
11 Claims. (Cl. 24—201)

The present invention relates to an improved sliding fastener of the type possessing two fastener or coupling strips and a slider serving for coupling and uncoupling the aforesaid strips. Moreover, at least one of both of these fastener or coupling strips is formed of flexible, elastic material.

Fasteners are already known to the prior art in which the coupling strips possess a special configuration. In particular, fasteners are known in which the one coupling strip exhibits the form of an anchor provided with a securing portion and the other coupling strip the form of a clamp engaging about the aforesaid anchor.

Prior art fasteners have the disadvantage that with larger demands placed upon them by tension or pulling forces, both of the coupling strips tend to release their operable connection if the connecting or coupling profile is of simple construction or elastic, or else, the strips do not permit intercoupling by means of a slider if the coupling profile is complicated.

It is, therefore, an important object of the present invention to provide an improved sliding fastener which overcomes these disadvantages, particularly by imparting a special configuration to both of the coupling strips, as well as by providing a slider or slide member which renders possible the coupling and uncoupling of both of these coupling strips.

Another important object of the present invention has reference to the provision of an improved sliding fastener which is, easy to manipulate in order to release and connect the coupling strips of the fastener, highly reliable in operation, does not tend to unintentionally come apart during normal conditions of use, as well as being generally economical to manufacture.

Accordingly, it will be appreciated that the present invention relates to an improved sliding fastener which fulfills the aforementioned objects and comprises a slider or slide member and two coupling strips symmetrical to their longitudinal plane, of which at least one is formed of flexible elastic material. Moreover, of both of these coupling strips one exhibits an anchor and a U-shaped or substantially U-shaped securing portion, whereas the other coupling strip embodies a clamp engaging about such anchor, whereby with the fastener in closed condition the clamp engages at its free end in the securing portion.

Characteristic of the inventive fastener is that the legs of the securing portion are constructed as bands or strips extending parallel to the plane of symmetry, the free ends of which are rearwardly tapered or sloped towards the outside, and that the free end portions of the clamp exhibit a Z-form. Furthermore, with coupled fastener condition the clamp portions engage in grooves of the securing portion and are tapered parallel to the tapering of the associated legs, with the clamping portions bearing against the tapering of the legs. Additionally, the slider is internally provided with a guide member which during uncoupling raises the clamp at the root of the Z-form of the anchor and pulls such out of their anchoring and out of the grooves of the securing portion without deforming to any great extent such securing portion, and which slider is further destined to bring the coupling strips into such a terminal—and open position that the clamp ends encompass in at least partially overlapping manner the anchor portion at both sides.

Other features, objects and advantages of the invention will become apparent by reference to the following detailed description and drawings in which:

FIGURE 1 is a schematic plan view of a fastener designed according to the invention and applied to an object which is to be closed;

FIGURE 2 is a view of the slider from its opening side;

FIGURE 7 is a cross-sectional view taken through the slider depicted in FIGURE 3 along lines A—A thereof with indicated coupling strips.

Figure 6:
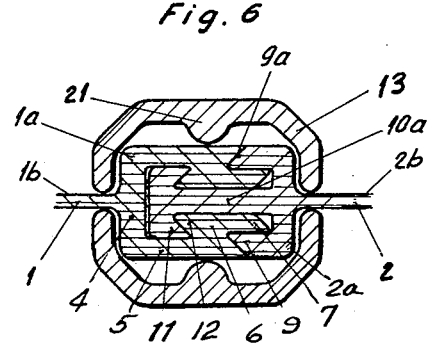
FIGURE 6 is a cross-sectional view of the slider fastener of FIGURE 1 taken along lines F—F thereof and with the coupling strips illustrated therein.

Describing now the drawings in detail, in the preferred manifestation of sliding fastener according to the invention such comprises two fastener or coupling strips 1 and 2 to be coupled, wherein such coupling strips 1 and 2 are capable of being brought into or out of engagement or operable interconnection with one another by means of a slider or slide member 3. The specific configuration of both coupling strips 1 and 2 can best be seen by inspecting FIGURE 6, such being therein depicted in closed position.

The coupling strip 2 exhibits a U-shaped securing portion 2a provided with a base web or flange 8 and two securing legs 9 extending perpendicular thereto which are constructed as ledges or strips. The legs 9 include tapered ends 9a extending rearwardly towards the outside. An anchor leg or web 10a provided with an anchor 10 is connected to the base flange 8. The anchor 10 exhibits undercut edges or edge portions 11 (FIGURE 6) directed towards the aforesaid base flange 8.

The coupling strip 1 provides the engaging of encompassing portion 1a which surrounds the anchor 10 of the coupling strip 2, and which possesses essentially the shape of a clamp. This coupling strip 1 exhibits a base web or flange 4 to which connect ledge-like legs 5 extending perpendicular thereto and provided with tapered ends 5a (see FIGURES 3 and 4) extending forwardly towards the outside, wherein the tapering thereof corresponds to that of the legs 9. The legs 5 exhibit at their forward portions inwardly directed, angled dovetailed band or ledges 6 which engage behind the edges 11 of the anchor 10 by means of their rearward edges or ends 12, and which with their free ends 7 engage in grooves 9b provided between the anchor leg or web 10a and the legs 9 of the coupling strip 2. It will be appreciated that the coupling strips 1 and 2 are symmetrically constructed with regard to their central longitudinal plane.

It should thus also be readily appreciated that with such a configuration of the coupling strips 1 and 2 a loosening of both of these aforementioned strips, when using a relatively rigid, yet however flexible material formed of synthetic material e.g. plastic, under tension or pulling stress is practically impossible, since a pulling upon the anchor 10 presses the ledges or bands 6 into the grooves 9b behind the securing leg portions 9 which, in turn, are prevented from deviating towards the outside by means of the forward, externally tapered ends 5a of the legs 5.

A specially formed slider is required for coupling and uncoupling these coupling strips 1 and 2 and which is capable of bringing the relatively complicated individual portions of both coupling strips 1 and 2 into their closed position and to release the same from such. Details of a preferred form of slider construction can best be ascertained by reference to FIGURES 2 and 7 wherein it will be appreciated that the slider 3 comprises a housing 13 the cross section of which narrows from the opening side towards the closing side and which exhibits the different units or physical structure serving for coupling and uncoupling. Both of the coupling strips 1 and 2 are completely surrounded by the slider housing 13 with the exception of the associated flanges 1b and 2b extending externally therefrom.

In FIGURE 2 the slider 3 is depicted as viewed from the opening side. At the opening side a guide portion 14 is arranged at the slider housing 13 and is in connection via flanges 15 with such slider housing 13. The guide portion 14 together with the flanges 15 divides such housing 13 at the opening side into two compartments or chambers 16 and 17, the first of which, namely compartment 16, serves to receive the coupling strip 1 and the second, namely compartment 17, to receive the coupling strip 2. Furthermore, the guide portion 14 exhibits ledges 18 and together with the latter and the housing 13 surrounds the compartment 17, the cross-section of which corresponds to that of the coupling strip 2. The compartment 16 formed by the external side of the guide portion 14 and the housing 13 is configured such that the legs 5 of the coupling strip 1 can be spread apart, as best seen by reference to FIGURE 3.

The guide portion 14 extends from the opening side towards the closing portions and terminates in front of the same (see FIGURE 7). The form or shape of the guide portion 14 continually changes from the opening side until reaching its other end. The portion 14' reduces in wedge-shaped manner and terminates between the region of the section lines D—D (FIGURE 4) and E—E (FIGURE 5) at the location G (FIGURE 7). The ledges 18 and the webs or flanges 15 terminate between the section lines C—C and D—D. Additionally, at the housing 13 there are formed guide edges 15' (FIGURE 4) which extend from the section lines C—C up to between the section lines D—D and E—E (FIGURE 7).

The portions 14" of the guide portion 14 exhibit a change in form between the section lines C—C and D—D insofar as they become free, thin, knife-like guide wedge pieces 19 (FIGURE 4), each exhibiting a respective projecting edge 20 forming a respective shoulder. These guide pieces 19 (FIGURES 5 and 7) extend past the end or location G of the guide portion 14 and terminate between the section lines E—E and F—F.

The housing 13 becomes smaller in the direction of the section lines A—A from the opening side towards the closing side, as such can best be seen from FIGURES 3-7. Approximately starting from the location of the section lines E—E (FIGURE 5) the housing 13 exhibits pressure or contact ledges 21 serving to close both of the coupling strips 1 and 2.

Figure 3:
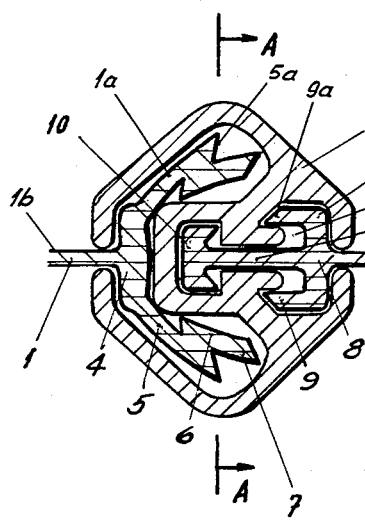
FIGURE 3 is a cross-sectional view of the slider fastener of FIGURE 1 taken along lines C—C thereof and with the coupling strips illustrated therein.

The closing of the aforedescribed sliding fastener takes place in the following manner: When the fastener is open then both of the coupling strips 1 and 2 are in a position where they are separated from one another as shown in FIGURE 3. By displacing the slider 3 in the closing direction, the clamp portions 5–7 are flexed inwardly due to the narrower housing 13 (FIGURE 4) and the inner ledges 6, 7 of the clamp portion 5 are pressed against the anchor web or leg 10a by means of the guide edges 15', whereby the free end members 7 are bent towards the corresponding grooves 9b of the securing leg portions 9. Since the guide portion 14' has become thiner and the portion 14" already exhibits the edges 20, during the contact or pressing movement the ledge or edge portion 12 of the clamp 5 is pressed into the shoulder beneath the edges 20.

Figure 4:
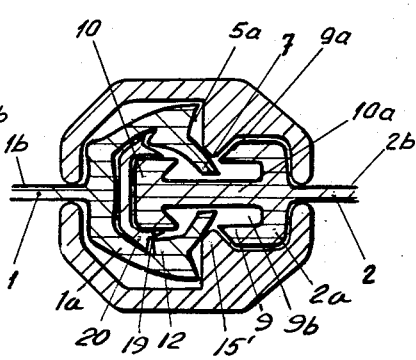
FIGURE 4 is a cross-sectional view of the slider fastener of FIGURE 1 taken along lines D—D thereof and with the coupling strips illustrated therein.
Figure 5:
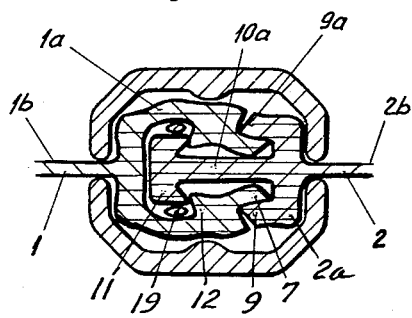
FIGURE 5 is a cross-sectional view of the slider fastener of FIGURE 1 taken along lines E—E thereof and with the coupling strips illustrated therein.

With further displacement of the slider 3 out of the position depicted in FIGURE 4 the clamp portions 5, 6 are further moved towards the anchor 10 by virtue of the continuing of the narrowing of the housing 13 and the disappearance of the guide portion 14', and indeed such, that the leg portions 7 of the ledges 6 enter into the grooves 9b between the anchor web 10a and the leg 9, and the portions 12 of the ledges 6 enter behind the undercut edge portions 11 of the anchor 10, as such is best depicted in FIGURE 5. In so doing, the legs 9 of the securing portion of the coupling strip 2, in accordance with the employed material, hardly deform, or at best to only a small extent. From the guide members there is now only still located the knife-like guide wedges or pieces 19 between the anchor 10 and the clamp portions 5. With further displacement the aforesaid guide pieces 19 also come out of operation and the pressure ledges 21 complete interengagement of both coupling strips 1 and 2, finally to partake the form illustrated in FIGURE 6.

During opening of the fastener the reverse sequence of operations takes place. Initially, the knife-like guide pieces 19 enter between the anchor 10 and the clamp portions 5 and free the ledge portions 12 from their engagement with the anchor edge portions 11. It is of great importance that the beginning of the opening operation takes place exactly at this location, and indeed for the reason that here is the location of the smallest cross-section of the clamp portions 5 and the deflecting-out operation at this weakest location requires the smallest expenditure of force. Above all, however, the aforesaid deflecting or bending out at this location provides the advantageous effect that initially each ledge portion 12 is released from the anchor 10 and then the leg portion 7 is pulled out of the associated groove 9b at the securing portion 9, such being of particular importance in such case where the aforesaid securing portion is formed of less elastic material.

The further separation of both coupling portions or strips 1 and 2 occurs by virtue of the appearance or action of the wedge-shaped guide portion 14' until reaching the position depicted in FIGURE 3. If now, the coupling strips 1 and 2 move out of the slider 3 the clamp portions 5, 6 in consequence of their elasticity lie about the anchor 10, so that they overlap the anchor 10 at both sides in the position depicted in FIGURE 3. This measure provides the advantage that the fastener also in opened condition does not free or expose the container contents without doing anything further, rather maintains the opening covered such that the entry of undesired foreign particles is prevented.

Advantageously, both the coupling strips 1 and 2 are formed of flexible, elastic synthetic material, e.g. synthetic or natural organic polymers exhibiting a certain rigidly, as for instance formed of polyvinylchloride, polyethylene, rubber, among others.

In order to increase the rigidity of the fastener without rendering more difficult the coupling and uncoupling action, it is possible to employ a material for the coupling strip 2 which is more rigid than that of the coupling strip 1, which even can be very or completely rigid. The coupling and uncoupling is rendered possible by the more flexible material of the coupling strip 1. It is possible to also use metal as material for the coupling strip 2, aluminum for example, which does not in any way impair the function of coupling and uncoupling due to the elasticity of the coupling strip 1. In the last-mentioned situation there is provided for a further increase of the rigidity or stiffness in the presence of lateral tension stresses.

The heretofore described sliding fastener of the invention fulfills the problem of easily, releasably connecting materials with one another which are formed of synthetic material or covered with synthetic material, or even other materials, whereby however, there is provided a considerable rigidity as well as also sealability or tightness, for instance for vessels, sacks, containers, tents, plates, walland ceiling coverings, protective coverings, insulations, pipes and so forth.

In order to guarantee for the aforementioned sealability or tightness during closing, with containers for example, both ends of the coupling strips 1 and 2 are non-releasably connected with one another so that an opening by means of the slider is only possible between both of these points.

While there is shown and described a present preferred embodiment of the invention it is to be distinctly understood that the invention is not limited thereto but may be otherwise variously embodied and practised within the scoep of the following claims.

What is claimed is:

1. Sliding fastener comprising, in combination: a pair of coupling strips adapted to be selectively coupled and uncoupled with respect to one another and constructed symmetrical with regard to their respective longitudinal plane, at least one of said coupling strips being formed of flexible elastic materials, another means and a substantially U-shaped securing portion provided for a given one of said pair of coupling strips, clamp means including free ends provided at the other coupling strip engaging about said anchor means and which in the coupled condition of said coupling strips engage by means of said free ends with said securing portion, said securing portion including leg means constructed as ledges extending parallel to the plane of symmetry of said coupling strips, said leg means of said securing portion having free ends tapered rearwardly towards the outside, said clamp means further including free end portions terminating at said free ends thereof and exhibiting a substantially Z-shaped configuration, said securing portion being provided with groove means, said free ends of said clamp means engaging with said groove means in the coupled condition of said coupling strips and being tapered parallel to the associated tapered free end of said leg means of said securing portion, said free end portions of said clamp means including a respective clamping portion bearing against said tapered free ends of said leg means of said securing portion, a slide member cooperating with said coupling strips for coupling and uncoupling thereof, said slide member being internally provided with guide means which during uncoupling of said coupling strips raise said clamp means at the root of its respective Z-shaped free end portion from said anchor means and pull such out of its anchoring and out of the associated groove means of said securing portion without deforming said securing portion to any great extent, said guide means being further constructed such as to bring said coupling strips into a terminal- and open position such that said free end portions of said clamp means at least partially surround in overlapping fashion said anchor means at both sides thereof.

2. Sliding fastener according to claim 1, said slide member including a slide housing exhibiting an opening and closing side respectively, said slide housing being provided in the region of its opening side with guide ledge means which together with said slide housing and said guide means form a member defining a compartment which at least approximately enclose said given one coupling strip provided with said anchor means.

3. Sliding fastener according to claim 1, said anchor means including a lengthwise extending anchor leg, said slide housing further exhibiting inwardly directed guide edges which during coupling and uncoupling of said coupling strips press said free end portions of said clamp means towards said lengthwise extending anchor leg of said given one coupling strip.

4. Sliding fastener according to claim 1 wherein said guide means exhibit knife-like guide wedge pieces increasing towards the opening side of said slide member and arranged at both sides of the plane of symmetry of said coupling strip, said knife-like guide wedge pieces serving for uncoupling said clamp means from said anchor means and said free end portions of said clamp means from said securing portion as well as for coupling the aforementioned members, said knife-like guide wedge pieces sliding between said anchor means and said clamp means upon actuation of said slide member.

5. Sliding fastener according to claim 1 wherein said clamp means and said anchor means each include edge portions, shoulder means provided at said guide means by means of which said edge portions of said clamp means during uncoupling are guided out of said edge portions of said anchor means in the open position of said coupling strips and during coupling are guided out of said open position into said edge portions of said anchor means.

6. Sliding fastener according to claim 1 wherein said slide member includes a slide housing exhibiting an opening and closing side respectively, said slide housing incorporating pressure ledges in the region of said closing side which during coupling of said coupling strips completely pushes said other coupling strip against said given one coupling strip.

7. Sliding fastener according to claim 1 wherein both of said coupling strips are arranged in rigid operable engagement with one another at one of both ends of an opening to be closed at a container provided with the sliding fastener.

8. Sliding fastener according to claim 1 wherein said coupling strips each include associated flange means, said slide member including a slide housing which completely encloses both of said coupling strips with the exception of said flange means thereof.

9. Sliding fastener according to claim 1 wherein said given one coupling strip is formed of material which is more rigid than the material of said other coupling strip.

10. Sliding fastener according to claim 7 wherein said given one coupling strip is formed of rigid material and said other coupling strip is formed of flexible material.

11. Sliding fastener comprising, in combination: a pair of coupling strips adapted to be selectively coupled and uncoupled with respect to one another, anchor means and a substantially U-shaped securing portion provided for a given one of said pair of coupling strips, clamp means provided at the other coupling strip engaging about said anchor means and which in the coupled condition of said coupling strips engage with said securing portion, said securing portion including leg means having rearwardly tapered free ends, clamp means including free end portions, said securing portion being provided with groove means, said free end portions of said clamp means engaging with said groove means in the coupled condition of said coupling strips, said free end portions of said clamp means including a respective clamping portion bearing against said tapered free ends of said leg means of said securing portion, a slide member cooperating with said coupling strips for coupling and uncoupling thereof, said slide member being internally provided with guide means which during uncoupling of said coupling strips raise said clamp means from said anchor means and pull such out of its anchoring and out of said groove means of said securing portion without deforming said securing portion to any great extent, said guide means being further constructed such as to bring said coupling strips into a terminal- and open position such that said free end portions of said clamp means at least partially surround in overlapping fashion said anchor means at both sides thereof.

References Cited by the Examiner
FOREIGN PATENTS 304,700    4/55    Switzerland.
1,023,684    3/53    France.

DONLEY J. STOCKING, *Primary Examiner.*

UNITED STATES PATENT OFFICE
CERTIFICATE OF CORRECTION

Patent No. 3,159,889                                       December 8, 1964

Willi Brandl

It is hereby certified that error appears in the above numbered patent requiring correction and that the said Letters Patent should read as corrected below.

Column 5, line 20, for "another means" read -- anchor means --.

Signed and sealed this 12th day of October 1965.

(SEAL)
Attest:

ERNEST W. SWIDER                                   EDWARD J. BRENNER
Attesting Officer                                        Commissioner of Patents